(12) United States Patent
Woo et al.

(10) Patent No.: US 11,439,933 B2
(45) Date of Patent: Sep. 13, 2022

(54) HIGH CAPACITY COMPOSITE DEPTH FILTER MEDIA WITH LOW EXTRACTABLES

(71) Applicant: EMD Millipore Corporation, Burlington, MA (US)

(72) Inventors: Maybelle Woo, Braintree, MA (US); David Yavorsky, Bolton, MA (US); John Amara, Reading, MA (US); Nripen Singh, Acton, MA (US); Kwok-Shun Cheng, Nashua, NH (US)

(73) Assignee: EMD Millipore Corporation, Burlington, MA (US)

( * ) Notice: Subject to any disclaimer, the term of this patent is extended or adjusted under 35 U.S.C. 154(b) by 260 days.

(21) Appl. No.: 16/720,102

(22) Filed: Dec. 19, 2019

(65) Prior Publication Data

US 2020/0129901 A1 Apr. 30, 2020

Related U.S. Application Data

(63) Continuation of application No. 14/890,774, filed as application No. PCT/US2014/053729 on Sep. 2, 2014.

(Continued)

(51) Int. Cl.
*B01D 39/16* (2006.01)
*B01D 29/66* (2006.01)

(52) U.S. Cl.
CPC ......... *B01D 39/1623* (2013.01); *B01D 29/66* (2013.01); *B01D 39/163* (2013.01);
(Continued)

(58) Field of Classification Search
None
See application file for complete search history.

(56) References Cited

U.S. PATENT DOCUMENTS

| 4,578,150 A | 3/1986 | Hou |
| 5,192,604 A | 3/1993 | Giglia |

(Continued)

FOREIGN PATENT DOCUMENTS

| CN | 101952210 A | 1/2011 |
| CN | 102859058 A | 1/2013 |

(Continued)

OTHER PUBLICATIONS

Office Action received for European Patent Application No. 14766611.9, dated Mar. 13, 2019, 5 pages.

(Continued)

*Primary Examiner* — Clare M Perrin
(74) *Attorney, Agent, or Firm* — EMD Millipore Corporation

(57) ABSTRACT

A depth filtration device for the clarification of biological fluids including a composite depth filter media having a nonwoven first layer integral with a second layer containing a polyacrylonitrile (PAN) fibers, a filter aid, and a wet-strength resin. The depth filter media exhibits increased binding capacity for soluble impurities such as DNA and host cell proteins from biological/cell culture feedstreams during secondary clarification and low-level impurity clearance of harvested cell culture fluids, such as those used for the manufacture of monoclonal antibodies. The depth filter media additionally exhibits significantly lower flushing requirements, resulting in lower levels of organic, inorganic and bioburden extractables released, high dirt holding capacities and good chemical and/or radiation resistance.

9 Claims, 7 Drawing Sheets

Related U.S. Application Data

(60) Provisional application No. 61/871,985, filed on Aug. 30, 2013.

(52) U.S. Cl.
CPC ............... *B01D 2239/0407* (2013.01); *B01D 2239/0654* (2013.01); *B01D 2239/086* (2013.01)

(56) References Cited

U.S. PATENT DOCUMENTS

| | | | |
|---|---|---|---|
| 5,638,284 A | 6/1997 | Helmer et al. | |
| 5,882,517 A | 3/1999 | Chen et al. | |
| 2004/0116026 A1* | 6/2004 | Kubose | B32B 5/06 442/340 |
| 2004/0118765 A1* | 6/2004 | Yavorsky | B01D 39/18 210/290 |
| 2007/0193938 A1 | 8/2007 | Yavorsky | |
| 2009/0178970 A1 | 7/2009 | Stanfel et al. | |
| 2010/0159581 A1 | 6/2010 | Yavorsky | |
| 2010/0176068 A1* | 7/2010 | Dallas | B01D 39/04 210/767 |
| 2010/0282682 A1* | 11/2010 | Eaton | B01D 39/1623 210/650 |
| 2011/0207196 A1 | 8/2011 | Koehler et al. | |
| 2016/0114272 A1 | 4/2016 | Woo et al. | |

FOREIGN PATENT DOCUMENTS

| | | | |
|---|---|---|---|
| JP | 07-80262 A | 3/1995 | |
| JP | 10-513113 A | 12/1998 | |
| JP | 2004-508180 A | 3/2004 | |
| JP | 2004-129941 A | 4/2004 | |
| JP | 2006-000848 A | 1/2006 | |
| JP | 2009-526635 A | 7/2009 | |
| JP | 2011-530405 A | 12/2011 | |
| JP | 2012-531531 A | 12/2012 | |
| JP | 2013-528712 A | 7/2013 | |
| JP | 2015-520026 A | 7/2015 | |
| WO | 96/23572 A1 | 8/1996 | |
| WO | 00/53286 A1 | 9/2000 | |
| WO | 2007/095335 A2 | 8/2007 | |
| WO | 2007/095363 A2 | 8/2007 | |
| WO | 2010/151447 A1 | 12/2010 | |
| WO | 2011/133396 A1 | 10/2011 | |
| WO | WO-2012143288 A1 * | 10/2012 | ............... E03C 1/00 |
| WO | 2015/031899 A1 | 3/2015 | |

OTHER PUBLICATIONS

International Search Report and Written Opinion Received for PCT Application No. PCT/US2014/053729, dated Dec. 19, 2014, 8 pages.

Pearson, et al., "Characterization of Limulus Amoebocyte Lysate-Reactive Material from Hollow-Fiber Dialyzers", Applied and Environmental Microbiology, vol. 48, No. 6, Dec. 1984, pp. 1189-1196.

3M, "Development of Low Pyrogenic Response and Ultra-low Metal Ion Extractables Zeta Plus (TM) Filter Medium", Customer Application Brief, 2011, 5 pages.

Chinga-Carrasco, "Cellulose fibres, nanofibrils and microfibrils: The morphological sequence of MFC components from a plant physiology and fibre technology point of view", Nanoscale Research Letters, 2011, vol. 6, pp. 1-7.

International Preliminary Report on Patentability received for PCT patent application No. PCT/US2014/053729, dated Mar. 10, 2016, 7 pages.

Jornitz et al., "Filtration and Purification in the Biopharmaceutical Industry", Second Edition, 2008, pp. 430-431.

Nordell, "Wet-Strength Development of Paper: Modification of cellulose fibres by adsorption of a natural biopolymer", Master's Thesis, Master of Science Program, Lulea University of Technology, 2006, 3 pages.

Purchas et al., "Handbook of Filter Media", 2nd Edition, Published by Elsevier Advanced Technology, 2002, pp. 15, 97-101, 118 and 389 with Korean Translation.

Rushton, et al., "Solid-Liquid Filtration and Separation Technology", Second, Completely Revised Edition, 2000, pp. 156-157, 2000, 5 pages.

Sutherland, "Filtration overview: A closer look at depth filtration", Filtration and Separation, vol. 45, Oct. 2008, pp. 25-28 with Korean Translation.

Su et al., "Structure and properties of carboxymethyl cellulose/soy protein isolate blend edible films crosslinked by Maillard reactions", Carbohydrate Polymers, vol. 79 (2010), pp. 145-153.

Sutherland, "Filters and Filtration Handbook", Fifth Edition, 2019, 4 pages.

Office Action received for Chinese Patent Application No. 201910112248.X dated Dec. 1, 2021, 36 pages (20 pages of English Translation & 16 pages of Official Copy).

Practical Cleaning Technology, Compilation group of Practical technical textbook, Guangdong Science and Technology Press, Dec. 31, 2007, p. 191. (See Attached Communication).

Non Final Office Action Received for U.S. Appl. No. 14/890,774, dated May 4, 2022, 9 Pages.

Office Action received for Chinese Patent Application No. 201910112248.x dated May 31, 2022, 28 Pages (19 Pages of English translation and 9 Pages of Official Copy).

\* cited by examiner

HIGH CAPACITY COMPOSITE DEPTH FILTER MEDIA WITH LOW EXTRACTABLES

RELATED APPLICATIONS

The present application is a Continuation of Application U.S. application Ser. No. 14/890,774, filed Nov. 12, 2015, which is a US National Stage application of International Application No. PCT/US2014/053729, filed Sep. 2, 2014, which claims the benefit of priority of U.S. Provisional Patent Application No. 61/871,985, filed Aug. 30, 2013, the disclosure of each of which is incorporated herein by reference in its entirety.

FIELD OF THE INVENTION

In general, the present invention relates to high capacity depth filter media with reduced pre-use flushing requirements, and an increased binding capacity for host cell proteins and other soluble impurities contained in biological product-containing feedstreams. More particularly, it relates to high capacity depth filtration devices used in the clarification of cell culture/biological feedstreams, which utilizes porous depth filter media which incorporates an inorganic filter aid having a sufficient surface area and adsorptive properties to extract soluble impurities from said feedstreams, and also exhibits significantly lower flushing requirements, resulting in lower levels of organic extractables released from the depth filter media after flushing.

BACKGROUND OF THE INVENTION

Depth filtration is commonly used in the clarification of cell cultures. As its name implies a depth filter utilizes its depth, or thickness, to carry out filtration. The filter is typically a material structured with a gradient density, generally having more large pores near the top and smaller pores at the bottom. Depth filters, unlike absolute filters, retain particles throughout the porous media, allowing for retention of particles both larger and smaller than the pore size. Particle retention is thought to involve both size exclusion and adsorption through hydrophobic, ionic and other interactions. Fouling mechanisms of a depth filter may include pore blockage, cake formation and/or pore constriction.

In many cases, depth filters can be run in series such that most of the coarser particles are removed during the first filtration stage and finer particles are filtered out in a second stage. Thus, in a cell culture where there is a broad distribution of particle sizes such as from cells and cell debris, depth filters are intended to retain the majority of suspended particulates.

Traditional depth media is composed of (1) cellulose, (2) diatomaceous earth (DE) or other filter aids, and (3) a wet-strength resin. However, these materials can contain trace amounts of beta glucans, metals and bioburden which can be extracted into the aqueous process stream.

In the biotech industry, these contaminants are undesirable and could pose potential interference with purification schemes, as well as have negative interactions with the product molecule or exceed typical acceptance criteria established by the industry. For example, it has been shown that material extracted from cellulose fiber filters, which was later identified as beta glucan, resulted in false positives for endotoxins in Limulus Amebocyte Lysate (LAL) testing (Pearson, F. C., et al 1984 Applied and Environmental Biology 48:1189-1196). In some cases, high levels of aluminum ions in the final product can have a neurotoxic effect on the human nervous system.

Prior to use, depth filters require extensive preflushing, usually with an aqueous solution such as water, to reduce the levels of organic and inorganic contaminants to an acceptable value.

To reduce bioburden, depth filters can be pretreated with a caustic sanitant such as 0.5 N NaOH for 30 min.

Another method for reducing depth filter bioburden is to subject the depth filter to radiation treatment such as gamma irradiation.

Still another method for reducing depth filter bioburden is by autoclaving or steam-in-place, in which the entire filter device containing the depth filter component is subjected to steam under high pressure. While these methods may reduce bioburden, they often have a negative impact on extractables.

Furthermore, diatomaceous earth (DE), a naturally-occurring material, is the primary source of metal extractables, and because DE is a naturally-occurring material its composition is subject to large variability depending on where the DE is mined. While pretreatment of DE with acid can reduce the metal extractables, it also adds an extra processing step. Other silica-based filter aids such as perlite or sand are also limited in this respect.

Activated carbon filter aids are usually sourced from natural materials such as wood or coconut shell and again, and its composition is also subject to considerable variation.

Extractables from cellulose/DE depth filters can also be derived from the materials of construction themselves, such as from shedding of fibers or particles during filtration. While the wet strength resin generally helps to "glue" or adhere together the fibers and DE, there is inevitably some portion of particulates that are easily released from the depth filter. Indeed, sheets of cellulose/DE media can produce a cloud of particulates from the simple action of fanning the filter sheet back and forth.

Filtration is limited by the available volume for particulates to accumulate, i.e., the dirt holding capacity. Traditional depth filters tend to have low dirt holding capacity as much of the volume of the filter is occupied by the fibers and filter aid. The depth filter media can also become rapidly plugged and lead to a buildup of a cake layer.

In addition, currently available depth filter media is not particularly well-suited for the removal of soluble impurities, such as DNA and host cell proteins, in processing cell culture/biological feedstreams. Such contaminants may interfere with the subsequent downstream purification steps including protein A affinity capture and bind/elute ion exchange chromatography steps. These impurities may significantly reduce product binding capacity and limit the operational lifetime of the chromatography media. Higher impurity loads may also require the introduction of additional flow-through polishing steps, expensive membrane adsorbers or columns packed with anion exchange resins to further reduce the impurity load to within acceptable levels.

SUMMARY OF THE INVENTION

In response to the above needs and problems associated with depth filter media, the present invention avoids extensive preflushing needs and release of organic, inorganic and bioburden extractables by providing a depth filter media having a reduced amount of extractables in the filters, thereby reducing the amount of water required for pre-use flushing, and exhibits an increased binding capacity for host cell proteins and other soluble impurities within a cell culture/biological feedstream during a flow through adsorption process for harvested cell culture fluids.

Another object of this invention is to provide a composite depth filter media comprising a nonwoven first layer integral with a second layer comprising (1) fibers, (2) a filter aid, (3) and a wet strength resin having a reduced amount of organic, inorganic and bioburden extractables, thereby reducing the amount of water required for pre-use flushing.

A further object of this invention is to provide a depth filter media comprising (1) nonwovens including polypropylene, polyesters, polyethylene, nylon, polyacrylonitrile, carbon and glass, (2) fibrillated fibers including polyacrylonitrile or polyacrylonitrile copolymer fibers having a Canadian Standard Freeness from about 10 mL to 800 mL, (3) filter aids including silica, alumina, glass, metal oxides or mixed-metal oxides, ion-exchange resins and carbon, and (4) wet strength resins including water-soluble synthetic polymers comprise urea or melamine-formaldehyde based polymers, polyaminopolyamide-epichlorohydrin (PAE) polymers and glyoxalated polyacrylamide (GPAM) resins.

Another object of this invention is to provide depth filter media having reduced shedding of particulates.

A further object of this invention is to provide a depth filter media with improved chemical or radiation resistance with lower flushing volumes than conventional depth filter media.

A further object of this invention is to provide entirely synthetic filter media with high dirt holding capacity and excellent retention of coarse\medium and fine particulates.

Another object of this invention is to provide a depth filter media having an increased binding capacity for soluble process impurities within a biological product feedstream. These soluble process impurities may include host cell proteins (HCP) and DNA. Such depth filter media permits a low level of host cell protein and DNA impurity clearance from harvested cell culture fluid (HCCF) feedstreams.

Another object of this invention is to provide a depth filter media that accomplishes this low level of impurity clearance by using a flow through adsorption process for soluble impurities which occurs alongside the secondary clarification of insoluble impurities, cellular debris, and colloidal matter.

Another object of this invention is to provide a depth filter media that incorporates inorganic filter aids of sufficient surface area and surface charge characteristics to bind a defined population of soluble process impurities, such as HCP and DNA, within the feedstream by a combination of ionic and hydrophobic adsorption mechanisms.

Additional features and advantages of the invention will be set forth in the detailed description and claims, which follows. Many modifications and variations of this invention can be made without departing from its spirit and scope, as will be apparent to those skilled in the art. It is to be understood that the foregoing general description and the following detailed description, the claims, as well as the appended drawings are exemplary and explanatory only, and are intended to provide an explanation of various embodiments of the present teachings. The specific embodiments described herein are offered by way of example only and are not meant to be limiting in any way.

DESCRIPTION OF THE EMBODIMENTS

Figure 1:
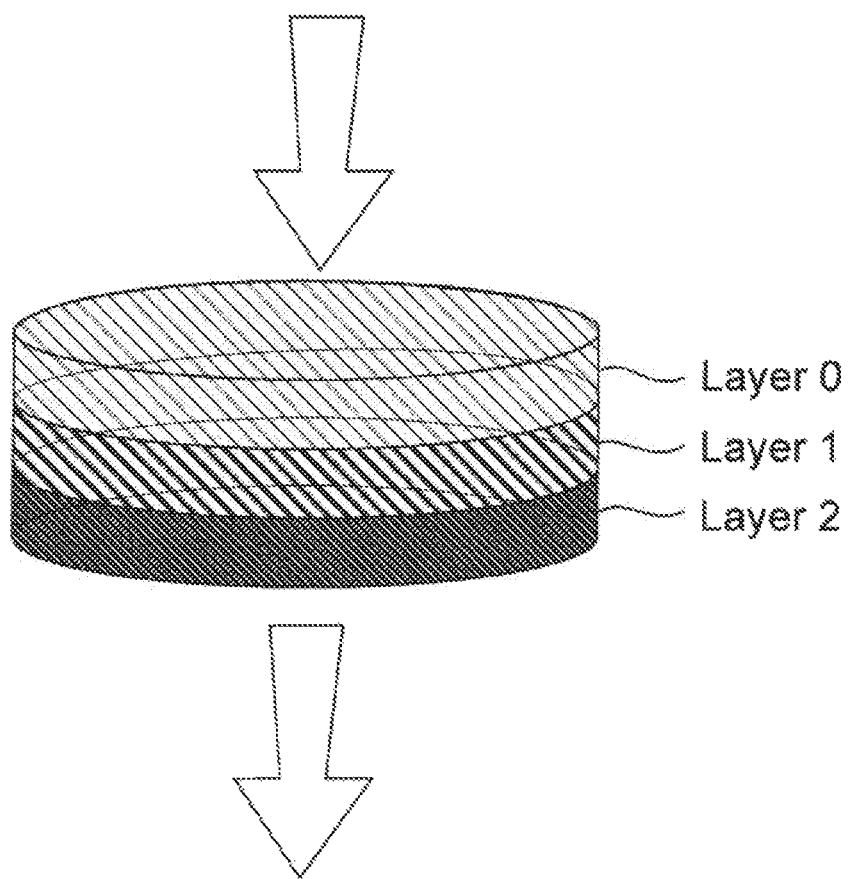
FIG. 1 depicts a schematic embodiment of one example of the depth filter media according to the invention.
Figure 2:
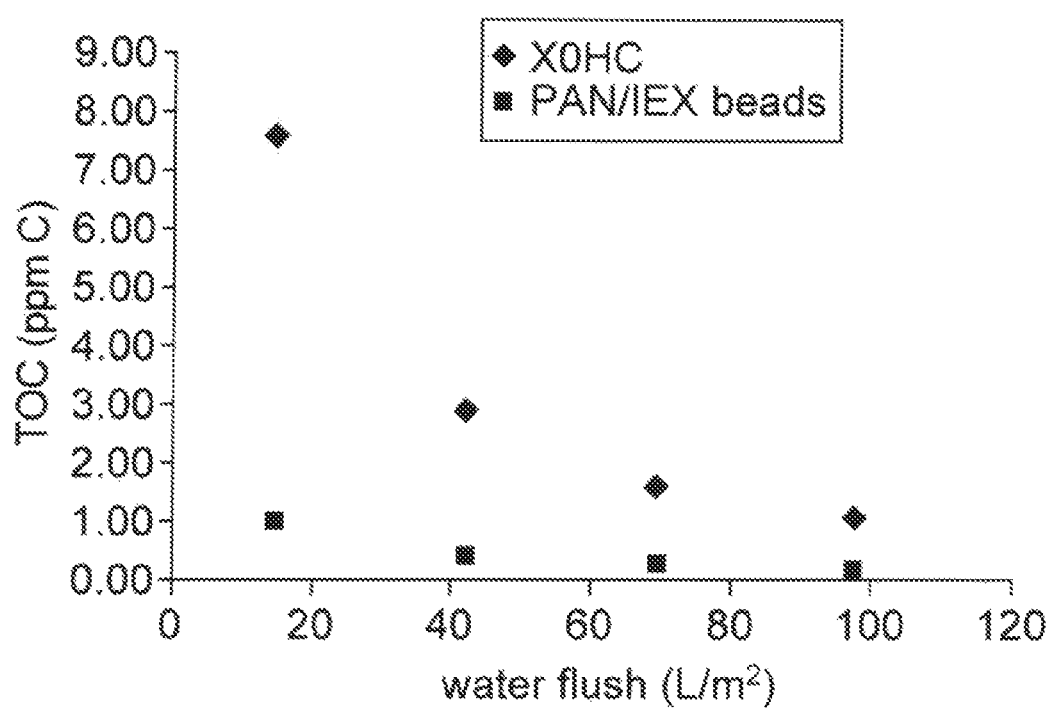
FIG. 2 depicts total organic carbon (TOC) flush out curves for filters flushed with 100 L/m$^2$ water at 600 LMH; fractions collected at designated intervals for TOC analysis.
Figure 3:
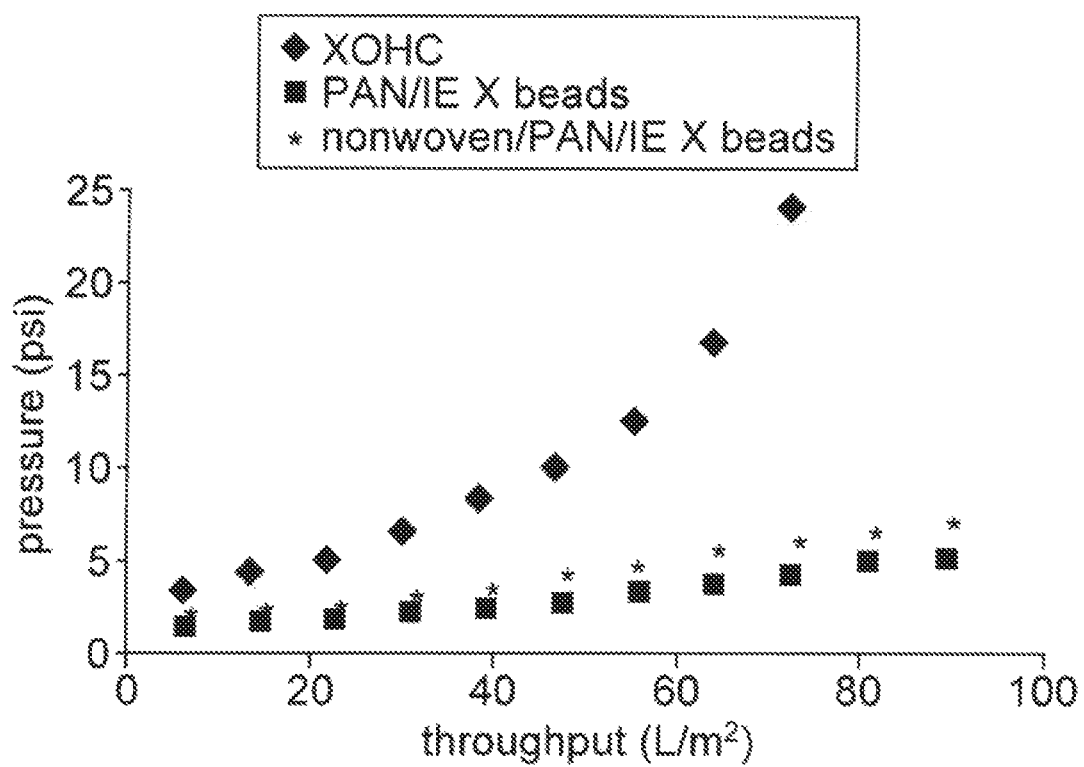
FIG. 3 depicts pressure profiles for filters loaded with clarified non-expressing CHOs cell culture at 100 LMH to 100 L/m$^2$.
Figure 4:
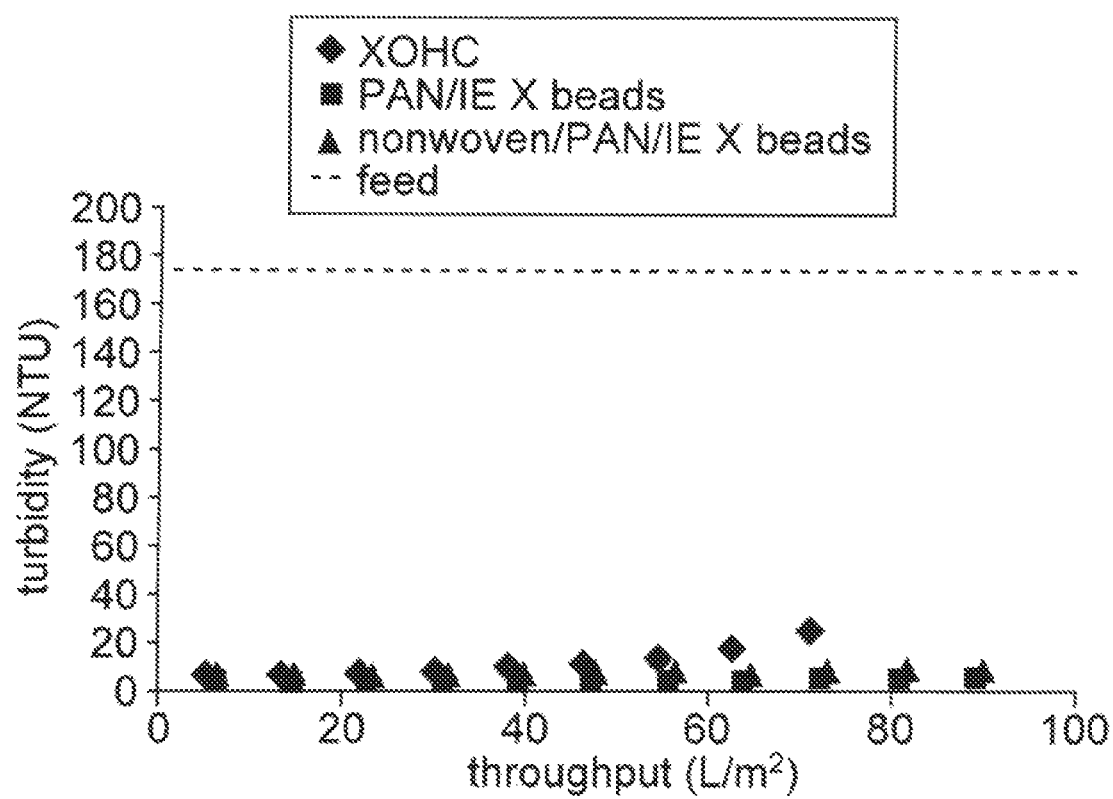
FIG. 4 depicts turbidity breakthrough curves for filters loaded with clarified non-expressing CHOs cell culture (173 NTU) at 100 LMH to 100 L/m$^2$; fractions collected at designated intervals.
Figure 5:
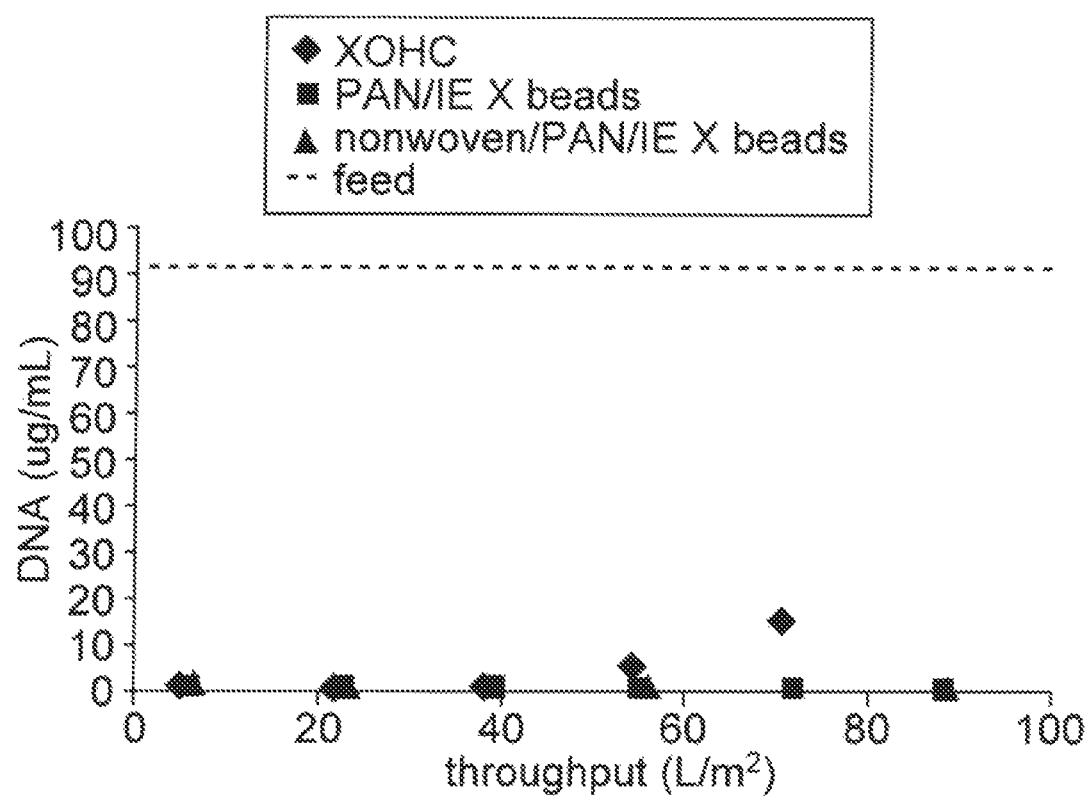
FIG. 5 depicts DNA breakthrough curves for filters loaded with clarified non-expressing CHOs cell culture (91 µg/mL) at 100 LMH to 100 L/m$^2$; fractions collected at designated intervals.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about" whether or not explicitly indicated. The term "about" generally refers to a range of numbers that one would consider equivalent to the recited value (i.e., having the same function or result). In many instances, the term "about" may include numbers that are rounded to the nearest significant figure.

Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass all sub ranges subsumed therein.

Before describing the present invention in further detail, a number of terms will be defined. Use of these terms does not limit the scope of the invention but only serve to facilitate the description of the invention.

All publications, patents and patent applications cited herein, whether supra or infra, are hereby incorporated by reference in their entirety to the same extent as if each individual publication, patent or patent application was specifically and individually indicated to be incorporated by reference.

As used herein, the singular forms "a," "an," and "the" include plural referents unless the context clearly dictates otherwise.

The term "bubble point pore size" or "BP" is the pore size of the largest pore in the filter medium.

As used herein the phrase "cell culture" includes cells, cell debris and colloidal particles, biomolecule of interest, HCP, and DNA.

The term "capture step", as used herein, generally refers to a method used for binding a target molecule with a chromatography resin, which results in a solid phase containing a precipitate of the target molecule and the resin. Typically, the target molecule is subsequently recovered using an elution step, which removes the target molecule from the solid phase, thereby resulting in the separation of the target molecule from one or more impurities. In various embodiments, the capture step can be conducted using a chromatography media, such as a resin, membrane or monolith.

The terms "Chinese hamster ovary cell protein" and "CHOP" as used interchangeably herein, refer to a mixture of host cell proteins ("HCP") derived from a Chinese hamster ovary ("CHO") cell culture. The HCP or CHOP is generally present as an impurity in a cell culture medium or lysate (e.g., a harvested cell culture fluid containing a protein or polypeptide of interest (e.g., an antibody or immunoadhesion expressed in a CHO cell). Generally, the amount of CHOP present in a mixture comprising a protein of interest provides a measure of the degree of purity for the protein of interest. Typically, the amount of CHOP in a protein mixture is expressed in parts per million relative to the amount of the protein of interest in the mixture.

The term "clarification step" or simply "clarification", as used herein, generally refers to one or more steps used initially in the purification of biomolecules. The clarification step generally comprises removal of cells and/or cellular debris using one or more steps including any of the following alone or various combinations thereof, e.g., centrifugation and depth filtration, tangential flow filtration, microfiltration, precipitation, flocculation and settling. In some embodiments, the present invention provides an improvement over the conventional clarification step commonly used in various purification schemes. The clarification step generally involves the removal of one or more undesirable entities and is typically performed prior to a step involving capture of the desired target molecule. Another aspect of clarification is the removal of soluble and insoluble components in a sample which may later on result in the fouling of a sterile filter in a purification process, thereby making the overall purification process more economical. The clarification step often includes a primary clarification step(s) upstream from a secondary clarification downstream. The clarification of cell culture harvests and high-solids feedstocks from large harvest volumes from modern production batch bioreactors (<25,000 L) and high cell densities often require primary, as well as secondary clarification steps prior to any subsequent chromatography operations and the like.

The terms "coarse filtration" or "coarse/medium filtration", as used herein, generally refer to the removal of mostly whole cells and some cellular debris in the purification of biomolecules.

The term "fine filtration", as used herein, generally refers to the removal of mostly cellular debris, colloidal particles and soluble impurities such as HCP, DNA, endotoxins, viruses and lipids in the purification of biomolecules.

The term "column volume" or "CV" as used herein refers to the volume of liquid equivalent to the volume of filter media. The volume of filter media may be calculated by the product of the surface area and the thickness of the filter.

Filter throughput values are generally expressed in terms of "liters/square meter" or "L/m$^2$" though for equivalent comparisons, "column volume" or "CV" is used to account for large differences of thickness between samples.

The terms "contaminant", "impurity", and "debris", are used interchangeably herein, refer to any foreign or objectionable material, including a biological macromolecule such as a DNA, an RNA, one or more host cell proteins (HCPs or CHOPs), endotoxins, viruses, lipids and one or more additives which may be present in a sample containing a protein or polypeptide of interest (e.g., an antibody) being separated from one or more of the foreign or objectionable molecules using a depth filter according to the present invention.

It is understood that where the host cell is another mammalian cell type, E. coli, yeast cell, insect, or plant, HCP refers to the proteins, other than target proteins, found in a lysate of the host cell.

The term "mean flow pore size" or "MFP" as used herein is the pore diameter at a pressure drop at which the flow through a wetted filter medium is 50% of the flow through the dry filter medium.

The term "monoclonal antibody" or "mAb" as used herein refers to an antibody obtained from a population of substantially homogeneous antibodies, i.e., the individual antibodies comprising the population are identical except for possible naturally occurring mutations that may be present in minor amounts.

As used herein the term "organic extractable(s)" refers to contaminants that in the presence of water or other aqueous solutions used during flushing, can potentially migrate or be extracted from materials used to make filter media or membranes, such as porous depth filter media. These contaminants may also include the materials of construction themselves which could potentially shed from the filter during flushing.

As used herein the phrase "low or lower organic extractable media" refers to a media that when extracted or flushed with water results in the removal of extractables that can migrate from a material into a solvent including water under exaggerated conditions of time and temperature.

The term "total organic extractable(s)" and "TOC" refers to the measurement of organic molecules present in an aqueous solution such as water and measured as carbon content. Analytical techniques used to measure TOC typically involve oxidation of all organic molecules in solution to carbon dioxide, measuring the resultant $CO_2$ concentration, and correlating this response to a known carbon concentration.

The term "parts per million" or "ppm" are used interchangeably herein.

Pore size ratings are usually given as a nominal value. In some cases, manufacturers provide a mean flow pore (MFP) size or a bubble point (BP) pore size. Both the MFP and BP can be measured using a capillary flow porometer.

The terms "target molecule", "target biomolecule", "desired target molecule" and "desired target biomolecule," are used interchangeably herein, and generally refer to a polypeptide or product of interest, which is desired to be purified or separated from one or more undesirable entities, e.g., one or more impurities, which may be present in a sample containing the polypeptide or product of interest.

As used herein the term "throughput" means the volume filtered through a filter.

As used herein the term "dirt holding capacity" is equivalent to filter throughput of a given cell culture fluid, either from direct harvest or previously clarified. Higher throughput represents higher dirt holding capacity.

The depth filter of the present invention comprises components (A) fibers, (B) filter aid, (C) wet strength resin and (D) a nonwoven. The combination of these components in various configurations yields depth filters with low extractables, high dirt holding capacities, good chemical and/or radiation resistance, and an increased binding capacity for host cell proteins and other soluble impurities contained in biological product-containing feedstreams Filter Materials Component A.

Fiber materials for use in depth filters have been widely disclosed. Non-cellulose based materials include microglass fibers and a variety of synthetic polymers such as polypropylene and polyesters. Especially useful are fibrillated fibers, fibers which have been processed to produce more surface area and a branched structure. Suitable fibrillated fibers include polyacrylonitrile or copolymers with polyacrylonitrile, polyethylene, polypropylene and Vectran, by Kuraray Co., Ltd. an aromatic polyester based fiber, either singly or in combination.

In preferred embodiments, fibers made from polyacrylonitrile (PAN) copolymers (Sterling Fibers Inc., Pace, Fla., USA) are used.

The degree of fibrillation of the fiber effects the Canadian Standard Freeness (CSF) or the drainage rate for a dilute suspension of the fibers. For example, more highly fibrillated fibers tend to have a lower CSF. The preferred CSF ranges from 10 mL to 800 mL; in some embodiments, a range of 600 mL to 750 mL is used. In other embodiments, a range of 200 mL to 600 mL is preferred. In still other embodiments, a range of 50 mL to 300 mL is preferred. In yet other embodiments, fibrillated fibers with different CSF can be combined to produce an average CSF in the range of 10 mL to 800 mL.

Component B.

Filter aids can be particles provided in a variety of shapes, sizes, and materials. For example, filter aid particles can be spherical, fibrous, plate-like or irregular. Further, the particles may be milled, ground, blended or processed in other ways known in the art to produce smaller particles of irregular shape. As with the shape of the particles, the size of the filter aid need not be a single value. It is desirable to have a distribution of particle sizes in the filter.

Processing, such as sieving or classification, can be done to size the particles into fractions of narrower particle size distributions. Generally, the size of the filter aid particles may range from about 0.01 µm to about 5 mm, preferably from about 10 µm to about 500 µm in some embodiments, from about 40 µm to about 200 µm in other embodiments, from about 0.1 µm to about 50 µm in still other embodiments, and from about 0.01 µm to about 50 µm in yet other embodiments.

The filter aid may be porous, having interconnected porosity or closed-cell porosity, or nonporous. Especially in the case of closed-cell porosity materials, if the particles are processed by milling, blending or the like to produce smaller particles, the closed pores could be opened to reveal the porosity and the particle would essentially become nonporous.

Examples, of synthetic filter aids which can be used include silica, alumina, glass, other metal oxides or mixed-metal oxides, ion-exchange resins and carbon. These materials can also be surface-modified by methods known to those skilled in the art to impart a charge, hydrophobic or other functionality.

Inorganic filter aids having a sufficient surface area and surface charge characteristics bind to a defined population of soluble process impurities, such as HCP and DNA, within the feedstream by a combination of ionic and hydrophobic adsorption mechanisms.

Examples of suitable silica filter aids include, but are not limited to, precipitated silicas, silica gel and fumed silicas. In certain embodiments, the preferred silica filter aids are preferably selected from precipitated silicas such as Sipernat® (Evonik Industries AG, Hanau-Wolfgang, Germany) or silica gels such as Kieselgel 60 (Merck KGaA, Darmstadt, Germany).

Alumina comes in many forms: porous, nonporous, acidic pH, neutral pH, basic (alkaline) pH, etc. In certain embodiments, the preferred alumina filter aid embodiment is porous and with a basic pH, such as Merck KGaA, Darmstadt Germany aluminum oxide 150 basic.

Examples of glass filter aids include controlled pore glass, e-glass and expanded glass. The preferred glass filter aid embodiment is expanded glass, and more preferably, expanded glass made from recycled glass, such as Poraver®, (Poraver North America Inc., Ontario, Canada).

Suitable ion-exchange resins are porous and rigid and preferably do no not swell or shrink significantly in the presence or absence of water. The preferred ion-exchange resin embodiment is preferably positively charged.

Examples of carbon include activated carbon spheres or fibers derived from rayon or other synthetic source.

Filter aids can be used singly or in combination so long as they produce the particle size ranges described above. The content by weight relative to the total weight of fiber and filter aid can range from 0% to about 90%, in some embodiments, from about 40% to about 80%.

Component C.

Wet strength resins are known in the art. They are water-soluble synthetic polymers with anionic and/or cationic groups used to impart strength to a material when wet. Suitable wet strength resins are urea- or melamine-formaldehyde based polymers, polyaminopolyamide-epichlorohydrin (PAE) polymers and glyoxalated polyacrylamide (GPAM) resins. Commercial resins are readily available from Ashland, Inc. (formerly Hercules Inc.), The Dow Chemical Company, BASF Corporation and Georgia-Pacific Chemicals LLC. The content by weight of the wet strength resin based on the total weight of the fiber and filter aid ranges between about 0.5% and 5%, preferably between 1% and 3%.

Component D.

Nonwovens are widely available in different materials, fiber diameters, basis weights, thicknesses and pore size ratings. They can be produced by various technologies such as meltblown, airlaid, spunbond, spunlace, thermal bond, electrospinning and wetlaid. Nonwovens can be made from polymers, inorganics, metallics or natural fibers. Suitable materials include polypropylene, polyesters, polyethylene, nylon, polyacrylonitrile, carbon and glass. Depending on the desired properties, fiber diameters can range from about 1 nm to about 1 mm. In a preferred embodiment, fiber diameters range from about 10 nm to about 30 µm. The basis weight is defined as the weight of a material per given area. Generally, basis weight ranges from 5 to 350 g/m$^2$.

In a preferred embodiment, the basis weight ranges from 20 to 300 g/m$^2$. The thickness of the nonwoven can vary from 50 µm to about 1 cm. In a preferred embodiment, the thickness of the nonwoven is about 0.1 to 0.3 cm.

In another embodiment, the thickness of the nonwoven is about 100 µm to about 500 µm.

In still other embodiments, several layers of a nonwoven may be stacked together to achieve a thickness in the range of 200 µm to 1,000 µm.

The filter Components (A) through (D) are combined in various configurations to make a depth filter having a gradient density pore structure.

In a preferred embodiment, the filter media are arranged such that the pore size rating of each layer is gradually reduced (i.e., pores size rating gets smaller from top (i.e., upstream side of media) and to bottom (i.e., downstream side of media) of the filter media), wherein the feed flow direction is typically from top to bottom of the filter media as well.

The following examples are provided for the purpose of further illustrating the present invention but are in no way to be taken as limiting. In addition, the following examples are provided so as to provide those of ordinary skill in the art with a complete disclosure and description of how to make and how to practice the methods of the invention, and are not intended to limit the scope of what the inventor regards as his invention. Efforts have been made to insure accuracy with respect to numbers used (e.g. amounts, temperature, etc.), but some experimental errors and deviation should be accounted for. Unless indicated otherwise, temperature is in degree Celsius (° C.), chemical reactions were performed at atmospheric pressure or transmembrane pressure, as indicated, the term "ambient temperature" refers to approximately 25° C. and "ambient pressure" refers to atmospheric pressure.

Unless otherwise specifically provided herein, the following methods, materials, processes, and conditions provided in sections (I) through (IV) below, were used in the practice of various embodiments of the invention, and are intended to be exemplary of the invention:

I. Layer Configuration

In the following examples, and as schematically depicted in FIG. 1, each filter in these embodiments contains up to three (3) component layers: where Layer zero (0) is a nonwoven or stacked multiple sheets of a nonwoven to give the desired thickness, and Layers one (1) and two (2) may be the same, but can optionally be made of similar or different materials of similar or different composition.

II. Handsheet Formation

Generally, fiber, water, and wet strength resin, if used, are processed in a readily available blender (Blendtec Corporation, Orem, Utah, USA). Filter aid is then blended in. The slurry is filtered onto a mesh support by gravity draining. Residual water is removed by vacuum filtration and drying at 105° C. for 1 to 2 h.

III. Process Scale Filter Media Formation

Numerous methods of forming fiber and filter aid into depth filter media on the processing scale are known in the art: air-laying, melt-pressing, mechanical compression and wet-laying. The preferred process for making depth filter media for Layers 1 and 2 is the wet-laid process: all components are dispersed in water to form a well-mixed slurry. The slurry is applied onto a moving belt where water is allowed to drain or a vacuum is applied to remove excess water. The subsequent pad formed travels along the belt through a series of ovens with adjustable temperature zones for drying. Preferably, the temperature zones range from 80° C. to about 250° C. Optionally, the media may also undergo compression through a series of rollers during heating to adjust for thickness. Preferably, the thickness of the media lies between 0.1 cm and 0.5 cm.

IV. Filter Assembly

The filter is assembled according to step A, stacked together so that Layer 0 precedes Layer 1 and Layer 1 precedes Layer 2. In the cases where Layer 0 is not used, Layer 1 precedes Layer 2. Layer 1 and Layer 2 may also be used individually.

The layer(s) are preferably housed inside a filter cell, reusable or disposable, such that each layer is in contact with the preceding layer and there is sufficient and minimal headspace for the challenge fluid to uniformly pass through the filter.

The following examples are provided so as to provide those of ordinary skill in the art with a complete disclosure and description of how to make the compositions of the invention and how to practice the methods of the invention and are not intended to limit the scope of what the inventor regards as his invention.

Efforts have been made to insure accuracy with respect to numbers used (e.g. amounts, temperature, etc.), but some experimental errors and deviation should be accounted for. Unless indicated otherwise, temperature is in degrees C., chemical reactions were performed at atmospheric pressure or transmembrane pressure, as indicated, the term "ambient temperature" refers to approximately 25° C. and "ambient pressure" refers to atmospheric pressure. The invention will be further clarified by the following examples which are intended to be exemplary of the invention.

Description of the Analytical Methods Used in the Examples.

(i) Water Flow Rate Test

The water flow rate of samples (23 $cm^2$) is measured at 10 psi.

(ii) Extractables Flush Test

Samples (23 $cm^2$) are flushed with water at 600 LMH to 100 $L/m^2$. Fractions are collected at predetermined intervals for TOC analysis.

(iii) Caustic Sanitization

Samples (23 $cm^2$) are flushed with 0.5 N NaOH at 100 to 300 LMH for 30 min. Samples are optionally subsequently flushed with water with fractions collected at predetermined intervals for TOC analysis. Filters are then equilibrated with 100 mM phosphate buffer pH 7.

(iv) Throughput and Retention

Samples (23 $cm^2$) are loaded with a cell culture feed stream or affinity capture pool at 100 LMH until the pressure drop across the filter reaches 20 psid. Filtrate fractions are collected at designated intervals, typically 5 minutes, and measured for turbidity; in some cases, fractions are also assayed for HCP, DNA, and/or mAb concentration.

EXAMPLES

Example 1

Depth filter compositions, for fine filtration, each having a two (2) layer configuration according to an embodiment of the invention include:

Filter 1A. polyacrylonitrile (PAN)/silica

Layer 1: 5.06 g PAN (Sterling Fibers CFF® 111-3 fibrillated pulp, CSF=250 mL), 0.38 g polyaminopolyamide-epichlorohydrin resin (Wet strenght resin C®), 304 mL water, and 3.22 g silica (Sipernat® 120 Evonik Corporation, Parsippany, N.J., USA)

Layer 2: same as Layer 1
Blending cycle: 30 s on Soups preset, then 10 Pulses
Filter 1B. polyacrylonitrile (PAN)/glass
Layer 1: 8.16 g PAN fibers (Sterling Fibers CFF 114-3, CSF=60 mL), 2.72 g PAN fibers (EFTec™ nanofibrillated fibers A-010-4, CSF=10 mL Engineered Fibers Technology, Shelton, Conn.), 0.48 g polyaminopolyamide-epichlorohydrin resin (Wet strength resin C®), 330 mL water, 3.03 g glass (Poraver® 0.040-0.125 mm, milled to average particle size 12 μm)
Layer 2: 2.72 g PAN fibers (Sterling Fibers CFF 114-3), 8.16 g PAN fibers (EFTec A-010-4), 0.48 g polyaminopolyamide-epichlorohydrin resin (Wet strenght resin C®), 330 mL water, 3.03 g glass (Poraver 0.040-0.125 mm, milled to average particle size 12 μm)
Blending cycle: 25 s on Soups preset, then 25 Pulses
Filter 1C. polyacrylonitrile (PAN)/ion exchange (IEX) bead
Layer 1: 6.33 g PAN fibers (Sterling Fibers CFF 114-3), 330 mL water, 4.03 g IEX beads (Reillex HPQ™ Polymer, milled to average particle size of 6.5 μm, Vertellus Specialties, Inc., Indianapolis, Ind., USA)
Layer 2: 3.16 g PAN fibers (Sterling Fibers CFF 114-3), 3.16 g PAN fibers (EFTec A-010-4), 330 mL water, 4.03 g IEX beads (Reillex HPQ, milled to average particle size of 6.5 μm)
Blending cycle: 25 s on Soups preset, then 25 Pulses
Filter 1D. polyacrylonitrile (PAN)/diatomaceous earth (DE)
Layer 1: 4.21 g PAN (Sterling Fibers CFF 111-3), 1.40 g PAN fibers (Sterling Fibers CFF 114-3), 0.27 g polyaminopolyamide-epichlorohydrin resin (Wet strenght resin C®), 330 mL water, and 3.58 g diatomaceous earth (MN-4/Celite® 507 in a 1:1 ratio Imerys Filtration Minerals Inc., San Jose, Calif., USA)
Layer 2: 1.40 g PAN (Sterling Fibers CFF 111-3), 4.21 g PAN fibers (Sterling Fibers CFF 114-3), 0.30 g polyaminopolyamide-epichlorohydrin resin (Wet strenght resin C®), 330 mL water, and 3.22 g diatomaceous earth (MN-4/Celite® 507 in a 1:3 ratio)
Blending cycle: 15 s on Speed 3 preset, then 10 s on Speed 1 preset
Filter 1E. polyacrylonitrile (PAN)/alumina
Layer 1: 6.53 g PAN (Sterling Fibers CFF 114-3), 2.18 g PAN fibers (EFTec A-010-4), 0.38 g polyaminopolyamide-epichlorohydrin resin (Wet strenght resin C®), 330 mL water, and 4.83 g alumina (Merck KGaA, milled to an average particle size of 12 μm)
Layer 2: 2.18 g PAN (Sterling Fibers CFF 114-3), 6.53 g PAN fibers (EFTec A-010-4), 0.38 g polyaminopolyamide-epichlorohydrin resin (Wet strenght resin C®), 330 mL water, and 4.83 g alumina (Merck KGaA, milled to an average particle size of 12 μm)
Blending cycle: 15 s on Speed 3 preset, then 10 s on Speed 1 preset
For comparison purposes, a conventional cellulose/diatomaceous depth filter, Millistak X0HC, is also presented.
Characterization of the depth filters

| Filter | Water flow rate (WFR) @10 psi (L/min/m$^2$) | Thickness (cm) |
| --- | --- | --- |
| 1A | 10 | 0.75 |
| 1B | 9 | 0.79 |
| 1C | 20 | 0.76 |
| 1D | 21 | 0.76 |
| 1E | 13 | 0.79 |
| X0HC control | 8 | 0.75 |

Example 2

Depth filter media for coarse filtration according to an embodiment of the invention was prepared on a conventional wet laid media production line using PAN (Sterling Fibers CFF 106-3, CSF=600 mL) and 2.5% polyaminopolyamide-epichlorohydrin resin (Wet strenght resin C®). Samples denoted PAN25 (23 cm$^2$ cutouts) had a basis weight of 711 g/m$^2$, a thickness of 0.40 cm and a water flow rate of 2038 L/min/m$^2$·DSF Example 3

Depth filter composition, for coarse/medium filtration, having a two (2) layer configuration according to an embodiment of the invention include:
Filter 3A. polyacrylonitrile (PAN)/glass
Layer 1: PAN25, as prepared in Example 2
Layer 2: 5.06 g PAN fibers (Sterling Fibers CFF 106-3), 0.75 g polyaminopolyamide-epichlorohydrin resin (Wet strenght resin C®), 300 mL water, 3.22 g glass (Poraver 1-2 mm, milled to average particle size 26 μm)
Blending cycle: 30 s on Soups preset, then 10 Pulses
For comparison purposes, a conventional cellulose/diatomaceous earth depth filter, Millistak+® D0HC, is also presented.
Characterization of the Depth Filter

| Filter | Thickness (cm) |
| --- | --- |
| 3A | 0.74 |
| D0HC control | 0.74 |

Example 4

Depth filter composition, for coarse/medium filtration, having a three (3) layer configuration, according to an embodiment of the invention includes:
Filter 4A. Nonwoven/PAN/glass
Layer 0: mixed synthetic fiber nonwoven (Hollingsworth & Vose, East Walpole, Mass., USA) having 215 g/m$^2$ basis weight, 0.20 cm thickness
Layer 1: PAN 25, as prepared in Example 2.
Layer 2: same composition as in Example 3A
Characterization of the Depth Filters

| Filter | Thickness (cm) |
| --- | --- |
| 4A | 0.78 |

Example 5

Depth filter compositions, for fine filtration, each having a three (3) layer configuration, according to an embodiment of the invention include:
Filter 5A. Nonwoven/PAN/IEX beads
Layer 0: polypropylene microfiber sheet (Hollingsworth & Vose East Walpole, Mass., USA) having 20 g/m$^2$ basis weight, 0.1 mm thickness, 6.5 mm mean flow pore diameter—two (2) sheets stacked together to make a total thickness of 0.2 mm Layer 1: same composition as in Example 1C
Layer 2: same composition as in Example 1C
Filter 5B. Nonwoven/PAN/glass
Layer 0: polypropylene microfiber sheet (Hollingsworth & Vose) having 20 g/m² basis weight, 0.1 mm thickness, 6.5 mm mean flow pore diameter—two (2) sheets stacked together to make a total thickness of 0.2 mm
Layer 1: same composition as in Example 1B
Layer 2: same composition as in Example 1B Characterization of the Depth Filters

| Filter | Water flow rate (WFR) @10 psi (L/min/m²) | Thickness (cm) |
|---|---|---|
| 5A | 15 | 0.85 |
| 5B | 9 | 0.79 |

Example 6

Filter 1A in Example 1 was subjected to an extractables flush and throughput and retention testing with a non-expressing CHOs feed stock. Conventional (i.e., comparative) depth filter media Millistak+® X0HC was also tested for comparison.

| Filter | TOC after 50 L/m² water flush (ppm) | Throughput (L/m²) | Turbidity retention (%) |
|---|---|---|---|
| 6A[a] | 0.49 | 82 | 99.7 |
| X0HC[a] | 2.46 | 46 | 99.8 |

[a]filters were only loaded to 10 psid

Filter 6A demonstrates lower TOC extractables and higher throughput than the conventional X0HC, while retaining similar turbidity retention values.

Example 7

To demonstrate feasibility on a manufacturing line, the composition from filter 1A in Example 1 was processed on conventional wet laid media production equipment. Sheets produced had a basis weight of 1130 g/m², a thickness of 0.43 cm and a water flow rate of 53 L/min/m². An extractable flush was done as provided herein.

The samples were additionally subjected to throughput and retention testing as provided herein with a primary-clarified non-expressing CHOs feedstock.

| Filter | TOC after 50 L/m² water flush (ppm) | Throughput (L/m²) | Turbidity retention (%) |
|---|---|---|---|
| 7A[a] | 1.19 | 80 | 99.8 |
| X0HC[b] | 2.98 | 55 | 99.9 |

[a]filter was only loaded to 8.0 psid
[b]filter was only loaded to 10 psid

Filter 7A demonstrates lower TOC extractables and higher throughput than the conventional X0HC, while retaining similar Turbidity retention values.

Example 8

Filter 7A in Example 7 was subjected to gamma irradiation (25-40 kGy). An extractables flush was done for both irradiated and nonirradiated samples. The extractables increased after exposure to gamma but relatively less so when compared to the conventional (i.e., comparative) depth media Millistak+® X0HC.

| Filter | TOC after 50 L/m² water flush (ppm) | Post-gamma, TOC after 50 L/m² water flush (ppm) |
|---|---|---|
| 7 | 1.31 | 4.28 |
| X0HC | 3.45 | 12.22 |

Example 9

Filter 1B in Example 1 was subjected to an extractables flush. Conventional depth filter, Millistak+® X0HC, was also tested for comparison.

| Filter | TOC after 50 L/m² water flush (ppm) | TOC after 100 L/m² water flush (ppm) |
|---|---|---|
| 1B | 1.11 | 0.53 |
| X0HC | 4.42 | 1.16 |

Filter 1B demonstrates lower TOC extractables than the conventional X0HC: only 50 L/m² water flush was needed for Filter 1B as compared to 100 L/m² for X0HC to achieve a similar TOC value of ~1.1 ppm.

Example 10

Filter 1B in Example 1 was subjected to caustic sanitization and tested for throughput and retention with a non-expressing CHOs feed stock centrate.

| | Flushed with water prior to load | | Sanitized with 0.5N NaOH prior to load | |
|---|---|---|---|---|
| Filter | Throughput (L/m²) | Turbidity retention (%) | Throughput (L/m²) | Turbidity retention (%) |
| 1B | 198 | 97.7 | 222 | 97.0 |

Filter 1B demonstrates similar Throughput and Retention values with and without a pre-use caustic sanitization treatment step.

Example 11

Layer 1, in filter 1C in Example 1, was subjected to gamma irradiation (25-40 kGy). An extractables flush was done for both irradiated and nonirradiated samples. The extractables increased slightly after exposure to gamma.

| Filter | TOC after 50 L/m² water flush (ppm) | Post-gamma, TOC after 50 L/m² water flush (ppm) |
|---|---|---|
| 1C Layer 1 | 0.89 | 2.53 |

Example 12

Filter 1C in Example 1 was also tested with a monoclonal antibody feedstock purified with a Protein A capture step for throughput and retention. The loading was 100 L/m². Host cell protein and DNA removal as well as product recovery in the pooled filtrate was also determined. Conventional depth filter, Millistak+® X0HC, was also tested for comparison.

| Filter | Turbidity retention (%) | HCP (LRV) | DNA retention (%) | mAb recovery (%) |
|---|---|---|---|---|
| 1C | 91.6 | 2.0 | >97 | 97 |
| X0HC | 91.2 | 1.5 | >97 | 91 |

Filter 1C demonstrates better HCP removal and higher product recovery than the conventional X0HC, while retaining similar Turbidity retention and DNA retention values.

Example 13

Filters PAN/DE and PAN/alumina

Filters 1D and 1E in Example 1 were both subjected to caustic sanitization followed by throughput and retention testing. Conventional depth filter, Millistak+® X0HC, was also tested for comparison.

| | Flushed with water prior to load | | Sanitized with 0.5N NaOH prior to load | |
|---|---|---|---|---|
| Filter | Throughput (L/m²) | Turbidity retention (%) | Throughput (L/m²) | Turbidity retention (%) |
| 1D | 123 | 99.0 | 155 | 98.9 |
| 1E | 155$^a$ | 98.8$^a$ | 156$^b$ | 99.0$^b$ |
| X0HC | 102 | 99.5 | 88 | 99.2 |

$^a$filter was only loaded to 17 psid
$^b$filter was only loaded to 11 psid

Example 14

Filter 3A in Example 3 was subjected to an extractables flush. Conventional depth filter, Millistak+D0HC, was also tested for comparison.

| Filter | TOC after 50 L/m² water flush (ppm) |
|---|---|
| 3A | 0.46 |
| D0HC | 3.05 |

Filter 3A demonstrates lower TOC extractables than the conventional D0HC.

Example 15

Layer 0 in filter 4A in Example 4 was subjected to gamma irradiation (25-40 kGy). An extractables flush was done for both irradiated and nonirradiated samples. There was no apparent change in the extractables after exposure to gamma.

| Filter | TOC after 50 L/m² flush (ppm) | Post-gamma, TOC after 50 L/m² water flush (ppm) |
|---|---|---|
| 4A, Layer 0 | 0.02 | 0.02 |

Example 16

Filter 4A in Example 4 was subjected to throughput and retention testing with a mAb feed stock.

| Filter | Throughput (CV) | Turbidity retention (%) |
|---|---|---|
| 4A | 4.7 | 96.9 |
| D0HC | 3.5 | 90.1 |

Filter 4A demonstrates higher throughput and turbidity retention as compared to the conventional D0HC.

Example 17

Filter 1C in Example 1 was subjected to an extractables flush.
Filter 5A in Example 5, and filter 1C in Example 1, were each subjected to throughput and retention testing with a mAb feed stock previously primary-clarified with Millistak+® D0HC. Filtrates were also characterized for DNA retention. For comparative purposes, conventional cellulose/diatomaceous earth media, Millistak+® X0HC, was also tested. The results are summarized and displayed in FIGS. 2 to 5.

| Filter | Throughput (CV) | Turbidity retention (%) | DNA retention (%) |
|---|---|---|---|
| 1C$^a$ | 11.7 | 98.3 | 99.9 |
| 5A$^b$ | 10.6 | 97.4 | 99.9 |
| X0HC | 8.8 | 95.2 | 95.3 |

$^a$filter was only loaded to 5.3 psid
$^b$filter was only loaded to 7.6 psid

The test results depicted in FIGS. 2 to 5 demonstrate:
1. Filter 1C (PAN/IEX beads) not only has a total overall lower TOC than the conventional filter X0HC, but the extractables profile starts off lower and ends lower.
2. Filters 1C (PAN/IEX beads) and 5A (nonwoven/PAN/IEX beads) have lower pressure profiles than X0HC. Indeed, the X0HC filter reaches 20 psi while the filters of the current invention stay well below 10 psi. This results in a significantly higher throughput of feed stock that can be processed through the filters of the current invention.
3. Filters 1C (PAN/IEX beads) and 5A (nonwoven/PAN/IEX beads) have lower turbidity profiles than X0HC. The filters of the current invention can be said to have higher turbidity retention. Significant turbidity breakthrough did not occur up to 100 L/m² in Filters 1C and 5A, as compared to some small breakthrough in X0HC at ~40 L/m². Continued loading of the filters may still provide good retention.
4. Filters 1C (PAN/IEX beads) and 5A (nonwoven/PAN/IEX beads) have lower DNA profiles than X0HC. The filters of the current invention can be said to have higher DNA retention. Significant DNA breakthrough did not occur up to 100 L/m² in Filters 1C and 5A, as compared to some small breakthrough in X0HC at ~50 L/m². Continued loading of the filters may still provide good retention.

Example 18

To further illustrate the advantages of PAN as compared to cellulose, all-fiber pads were formed using a 1% fiber in water slurry. The pads were dried at 105° C. for 2 h. Subsequently, each pad was immersed in water for several hours under agitation. The cellulose redispersed into loose fibers, while the PAN remained as a pad with no observable loose fibers.

In following Examples 19 to 27, under Component B—filter aid, the silica gel particle size ranges are fractions of commercially available Silica Gel 60, manufactured by Merck KGaA (Darmstadt, Germany), having a pore size of about 60 A (6 nm). The silica particles used in certain embodiments of the invention in these Examples were isolated by a sieving operation, wherein the first sieving fraction, labeled "fine silica particles", resulted in small/fine silica particles having a particle size≤(less than or equal to) about 5 microns, and the second sieving fraction, labeled "coarse silica particles", resulted in large/coarse silica particles having a particle size ≤(less than or equal to) about 40 µm.

TABLE 1

Table of depth filter media formulations used in the following examples.

| Depth filter media ID | Component A - fiber material (% loading) | Component B - filter aid (% loading) | Component C - wet strength resin (% loading) |
|---|---|---|---|
| 1-1 | PAN 106 (42%) | coarse silica particles (58%) | WET STRENGTH RESIN X (2%) |
| 1-2 | PAN 111 (42%) | coarse silica particles (58%) | WET STRENGTH RESIN X (2%) |
| 1-3 | PAN 106 (21%) PAN 111 (21%) | coarse silica particles (58%) | WET STRENGTH RESIN X (2%) |
| 1-4 | PAN 106 (50%) PAN 111 (50%) | — | wet strength resin Z (3%) |
| 1-5 | PAN 106-2 (42%) | coarse silica particles (58%) | wet strength resin Z (3%) |
| 1-6 | PAN 106 (50%) PAN 111 (50%) | — | wet strength resin Y (1%) |
| 1-7 | PAN 106-2 (42%) | coarse silica particles (58%) | wet strength resin Y (1%) |
| 1-8 | PAN 106-2 (100%) | — | WET STRENGTH RESIN X (2%) |
| 1-9 | PAN 106 (21%) PAN 111 (21%) | coarse silica particles (58%) | wet strength resin Z (3%) |
| 1-10 | PAN 106(100%) | — | wet strength resin Y (1%) |
| 2-1 | PAN 111 (32%) | Sipernat 120 (68%) | WET STRENGTH RESIN X (2%) |
| 2-2 | PAN 111 (32%) | Sipernat 120 (68%) | — |
| 2-3 | PAN 114 (32%) | fine silica particles (34%) coarse silica particles (34%) | WET STRENGTH RESIN X (2%) |
| 2-4 | PAN 114 (32%) | fine silica particles (51%) coarse silica particles (17%) | WET STRENGTH RESIN X (2%) |
| 3-1 | PAN 114 (46%) | fine silica particles (27%) coarse silica particles (27%) | — |
| 3-2 | PAN 114 (26%) | fine silica particles (37%) coarse silica particles (37%) | — |
| 3-3 | PAN 114 (46%) | fine silica particles (54%) coarse silica particles (0%) | — |
| 3-4 | PAN 114 (26%) | fine silica particles (74%) coarse silica particles (0%) | — |
| 3-5 | PAN 114 (46%) | fine silica particles (27%) coarse silica particles (27%) | WET STRENGTH RESIN X (4%) |
| 3-6 | PAN 114 (26%) | fine silica particles (37%) coarse silica particles (37%) | WET STRENGTH RESIN X (4%) |
| 3-7 | PAN 114 (46%) | fine silica particles (54%) coarse silica particles (0%) | WET STRENGTH RESIN X (4%) |
| 3-8 | PAN 114 (26%) | fine silica particles (74%) coarse silica particles (0%) | WET STRENGTH RESIN X (4%) |

TABLE 1-continued

Table of depth filter media formulations used in the following examples.

| Depth filter media ID | Component A - fiber material (% loading) | Component B - filter aid (% loading) | Component C - wet strength resin (% loading) |
|---|---|---|---|
| 3-9 | PAN 114 (37%) | fine silica particles (47%) coarse silica particles (16%) | WET STRENGTH RESIN X (2%) |
| comparative example 4-1 | cellulose (42%) | diatomaceous earth (DE1) tight (29%) diatomaceous earth (DE2) open (29%) | — |
| comparative example 4-2 | cellulose (22%) | DE1 (39%) DE2 (39%) | — |
| comparative example 4-3 | cellulose (42%) | DE1 (58%) DE2 (0%) | — |
| comparative example 4-4 | cellulose (22%) | DE1 (78%) DE2 (0%) | — |
| comparative example 4-5 | cellulose (42%) | DE1 (29%) DE2 (29%) | WET STRENGTH RESIN X (4%) |
| comparative example 4-6 | cellulose (22%) | DE1 (39%) DE2 (39%) | WET STRENGTH RESIN X (4%) |
| comparative example 4-7 | cellulose (42%) | DE1 (58%) DE2 (0%) | WET STRENGTH RESIN X (4%) |
| comparative example 4-8 | cellulose (22%) | DE1 (78%) DE2 (0%) | WET STRENGTH RESIN X (4%) |
| comparative example 4-9 | cellulose (32%) | DE1 (51%) DE2(17%) | WET STRENGTH RESIN X (2%) |
| 5-1 | PAN 114 (10%) PAN 111 (32%) | fine silica particles (29%) coarse silica particles (29%) | WET STRENGTH RESIN X (2%) |
| 5-2 | PAN 106 (21%) PAN 111 (21%) | coarse silica particles (58%) | WET STRENGTH RESIN X (2%) |
| 5-3 | PAN 106 (41%) | coarse silica particles (59%) | WET STRENGTH RESIN X (2%) |
| 6-1 | PAN 106 (21%) PAN 111 (21%) | coarse silica particles (58%) | wet strength resin Z (3%) |
| comparative example 6-2 | PAN 106 (100%) | — | wet strength resin Y (1%) |
| comparative example 6-3 | cellulose (42%) | diatomaceous earth (DE3) (53%) | wet strength resin Z (3%) |
| comparative example 6-4 | cellulose (100%) | — | wet strength resin Y (1%) |

Example 19

General procedure used for static binding capacity measurements.

Six grams of a depth filter media were suspended in 300 mL water and blended to form a dilute fiber slurry. The suspension was transferred to a 500 mL Nalgene® bottle using an additional 200 mL of water for rinsing. A 10 mL aliquot of the fiber suspension was transferred to a pre-weighed 15 mL centrifuge tube. The centrifuge tube was spun for 5 minutes in a bench-top centrifuge to pellet the fiber solids. The supernatant was removed by means of a pipette and 10 mL of either a 1 g/L BSA or 1 g/L myloglobin solution in 25 mM Tris pH 7.3 were added. Alternatively, for host cell protein static binding capacity measurements, a 10 mL aliquot of harvested cell culture fluid that had been centrifuged and sterile filtered through a 0.2 µm Millipore Express® membrane (EMD Millipore, Billerica, Mass.) was used. The fiber suspension was then agitated at room temperature for 18 hours. The centrifuge tube was then spun for 5 minutes in a bench-top centrifuge to pellet the fiber solids. For the protein static binding capacity measurements, a sample of the supernatant solution was taken for UV-vis measurement at 280 nm (for BSA) or 409 nm (for myoglobin) and the change in protein concentration from the feed sample was determined.

Alternatively, for host cell protein static binding capacity measurements, a 1 mL aliquot of the supernatant solution was taken for HCP ELISA assay. The remaining supernatant solution was then removed from the centrifuge tube and the damp material was dried in an oven at 60° C. for 18 to 36 hours. The final weight of the dry depth filter media was determined and this value was used to calculate the static binding capacity of the depth filter media by dividing the amount of adsorbed protein (or HCP) by the weight of the depth filter media. The obtained value is the static binding capacity in terms of mg (protein)/g (depth filter media).

Example 20

Static binding capacity measurements of selected depth filter media formulations.

BSA and myoglobin static binding capacity measurements were performed for various depth filter media formulations according to the method described in Example 19.

The static binding capacities for these samples are provided in Table 2.

The data in Table 2 shows that the BSA static binding capacities are comparable for all depth filter media formulations, regardless of PAN fiber type, silica loading, or resin type. In contrast, coarse silica particle (having a particle size less than or equal to about 40 µm) filter aides had an unexpectedly strong effect on the myoglobin static binding capacity. The four depth filter media formulations which lack the coarse silica particle filter aid gave no myoglobin SBC (compositions 1-4, 1-6, 1-8, 1-10), while the other six formulations demonstrate a high myloglobin SBC of approximately 30 mg/g (compositions 1-1 thru 1-3, 1-5, 1-7, and 1-9).

At the application pH of 7.3, myoglobin is largely uncharged (isoelectric point=6.8-7.2) and BSA is negatively charged (isoelectric point≈5). Under such conditions, modest BSA static binding capacities for the depth filter media formulations may occur by way of electrostatic interactions between the positively charged binder resin component and the negatively charged BSA. Under these same conditions, strong hydrophobic interactions may occur between the coarse silica particles and the uncharged myoglobin protein. While not wishing to be bound to any theory, it is alleged that the increased myoglobin static binding capacity may be attributed to the relatively large surface area for the coarse silica particle filter aid used in these depth filter media formulation embodiments.

TABLE 2

BSA and myoglobin SBC for selected depth filter media formulations.

| Depth Filter Media ID | BSA SBC (mg/g) | Myoglobin SBC (mg/g) |
|---|---|---|
| 1-1 | 8 | 33 |
| 1-2 | 8 | 31 |
| 1-3 | 6 | 32 |
| 1-4 | 5 | 0 |
| 1-5 | 6 | 27 |
| 1-6 | 7 | 1 |
| 1-7 | 8 | 28 |
| 1-8 | 7 | 1 |
| 1-9 | 9 | 29 |
| 1-10 | 5 | 1 |

Example 21

Static binding capacity measurements of selected depth filter media formulations.

BSA, myoglobin, and HCP static binding capacity measurements were performed for various depth filter media formulations according to the method described in Example 19, above. The static binding capacities for these samples are provided in Table 3.

The data in Table 3 that the BSA static binding capacities are comparable for all depth filter media formulations. In addition, as seen in Table 3, the type of silica filter aid had a strong effect on the myoglobin and HCP static binding capacity. The two depth filter media formulations prepared using the Sipernat 120 filter aid gave lower myoglobin and HCP static binding capacity values of around 18 mg/g and 3 mg/g for myoglobin and HCP, respectively.

The embodiments of the invention wherein the two formulations prepared using coarse silica particles resulted in increased myoglobin and HCP static binding capacity values of 49 mg/g and 6 mg/g, respectively. These results were surprising as it was not originally expected that the particular types of silica filter aids used would provide substantially different adsorption properties or binding capacities within this particular application. These results suggest that the type of silica filter aid employed in the depth filter media formulation strongly influences the performance of the filter media with regard to protein and impurity binding capacities and the adsorptive media performance characteristics in the target application.

TABLE 3

BSA, myoglobin and HCP SBC for selected depth filter media formulations.

| Depth Filter Media ID | BSA SBC (mg/g) | Myoglobin SBC (mg/g) | HCP SBC (mg/g) |
|---|---|---|---|
| 2-1 | 12 | 16 | 4 |
| 2-2 | 17 | 20 | 2 |
| 2-3 | 16 | 49 | 6 |
| 2-4 | 23 | 49 | 6 |

Example 22

Static binding capacity measurements of selected depth filter media formulations.

BSA, myoglobin, and HCP static binding capacity measurements were performed for various depth filter media formulations according to the method described in Example 19, above. The static binding capacities for these samples are provided in Table 4.

The data in Table 4 shows that the BSA, myoglobin, and HCP static binding capacity values are not significantly affected by large changes in the total silica filter aid loading or the blend ratio of the two silica particle sizes (coarse silica particles and fine silica particles). The elimination of the wet-strength binder resin in depth filter media formulations 3-1 thru 3-4 resulted in only a small reduction in the BSA static binding capacity for these four formulations.

TABLE 4

BSA, myoglobin and HCP SBC for selected depth filter media formulations.

| Depth Filter Media ID | BSA SBC (mg/g) | Myoglobin SBC (mg/g) | HCP SBC (mg/g) |
|---|---|---|---|
| 3-1 | 6 | 34 | 4 |
| 3-2 | 8 | 44 | 5 |
| 3-3 | 6 | 35 | 4 |
| 3-4 | 12 | 33 | 5 |
| 3-5 | 12 | 37 | 4 |
| 3-6 | 12 | 44 | 7 |
| 3-7 | 16 | 33 | 5 |
| 3-8 | 18 | 45 | 8 |
| 3-9 | 14 | 43 | 6 |

Example 23

Static binding capacity measurements of selected depth filter media formulations.

BSA, myoglobin, and HCP static binding capacity measurements were performed for various depth filter media formulations according to the method described in Example 19, above. The static binding capacities for these samples are provided in Table 5.

The data in Table 5 shows low myoglobin static binding capacity values for all of the comparative depth filter media formulations evaluated. These comparative depth filter media formulations are constructed using cellulose pulp, diatomaceous earth (DE) filter aid, and the same Wet strenght resin C® wet-strength binder resin. These examples provide further evidence of the unexpected adsorptive properties of the coarse silica particle filter aid in contrast to the DE filter aids typically employed in depth filter media formulations.

It was also discovered that the incorporation of Wet strenght resin C® wet-strength binder resin in examples 4-5 thru 4-9 resulted in a significant increase in BSA static binding capacity. This result is consistent with an adsorptive electrostatic interaction between the negatively charged BSA and the cationic wet-strength binder resin at the application pH of 7.3. The HCP static binding capacity was low for the four depth filter media formulations evaluated by HCP ELISA assay.

TABLE 5

BSA, myoglobin and HCP SBC for selected depth filter media formulations.

| Depth Filter Media ID | BSA SBC (mg/g) | Myoglobin SBC (mg/g) | HCP SBC (mg/g) |
|---|---|---|---|
| comparative example 4-1 | −2 | 2 | 1 |
| comparative example 4-2 | −4 | −1 | |
| comparative example 4-3 | −5 | 4 | |
| comparative example 4-4 | −8 | 5 | |
| comparative example 4-5 | 22 | 0 | |
| comparative example 4-6 | 13 | 1 | 2 |
| comparative example 4-7 | 12 | 1 | |
| comparative example 4-8 | 13 | 1 | 1 |
| comparative example 4-9 | 17 | 1 | 3 |

Example 24

Static binding capacity measurements of selected depth filter media formulations.

BSA, myoglobin, and HCP static binding capacity measurements were performed for various depth filter media formulations according to the method described in Example 19, above. The static binding capacities for these samples are provided in Table 6.

The data in Table 6 shows low BSA, myoglobin, and HCP static binding capacity values for comparative examples of depth filter media formulations 6-2 thru 6-4. These depth filter media formulations were prepared using either PAN only, cellulose only, or a mixture of cellulose and DE filter aid. In contrast, the incorporation of large silica particles filter aid into the 6-1 depth filter media formulation affords a modest BSA SBC and high myoglobin and HCP static binding capacity values. These examples provide a further evidence of the special adsorptive properties of the EMD silica filter aid in contrast to the DE filter aid and other materials of construction that are typically employed in such depth filter media formulations.

TABLE 6

BSA, myoglobin and HCP SBC for selected depth filter media formulations.

| Depth Filter Media ID | BSA SBC (mg/g) | Myoglobin SBC (mg/g) | HCP SBC (mg/g) |
|---|---|---|---|
| 6-1 | 4 | 42 | 5 |
| 6-2 | −1 | 1 | 1 |

TABLE 6-continued

BSA, myoglobin and HCP SBC for selected depth filter media formulations.

| Depth Filter Media ID | BSA SBC (mg/g) | Myoglobin SBC (mg/g) | HCP SBC (mg/g) |
|---|---|---|---|
| 6-3 | 0 | 1 | 1 |
| 6-4 | −5 | 1 | 0 |

Example 25

Depth filter compositions for clarification application testing.

Depth filtration devices were constructed using the selected depth filter media compositions and non-woven media as shown in the Table 7. These depth filtration devices were utilized in applications testing directed to the primary and secondary clarification of mAb producing and non-producing HCCF feedstreams.

TABLE 7

Depth filter compositions for clarification application testing.

| Depth Filter Device ID | Layer 0 | Layer 1 | Layer 2 |
|---|---|---|---|
| 7-1 | mixed synthetic fiber non-woven (300 g/m$^2$, 4 mm thickness) | depth filter media ID 1-10 | depth filter media ID 1-9 |
| 7-2 | synthetic fiber non-woven, 2 layers (34 g/m$^2$, 0.1 mm thickness) | depth filter media ID 2-3 | depth filter media ID 2-4 |
| 7-3 | synthetic fiber non-woven, 2 layers (34 g/m$^2$, 0.1 mm thickness) | depth filter media ID 2-3 | depth filter media ID 2-4, pressed |

Example 26

Improved filtration performance and HCP impurity clearance (mAb05 feed).

Figure 6A:
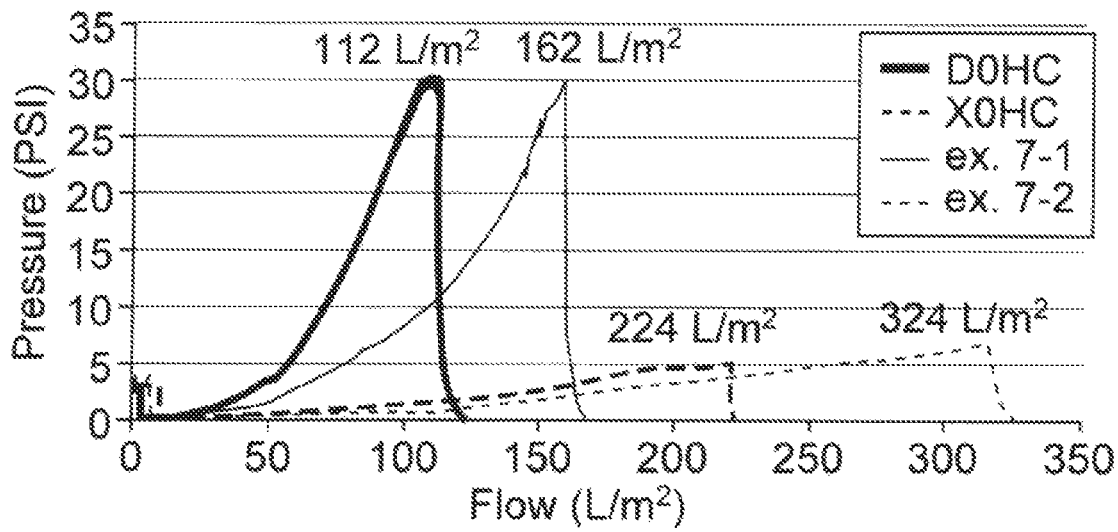
FIG. 6A are pressure profiles for coupled primary and secondary clarification devices described in example 25 (2:1 area ratio for primary:secondary clarification depth filters), in accordance with certain embodiments of the invention.
Figure 6B:
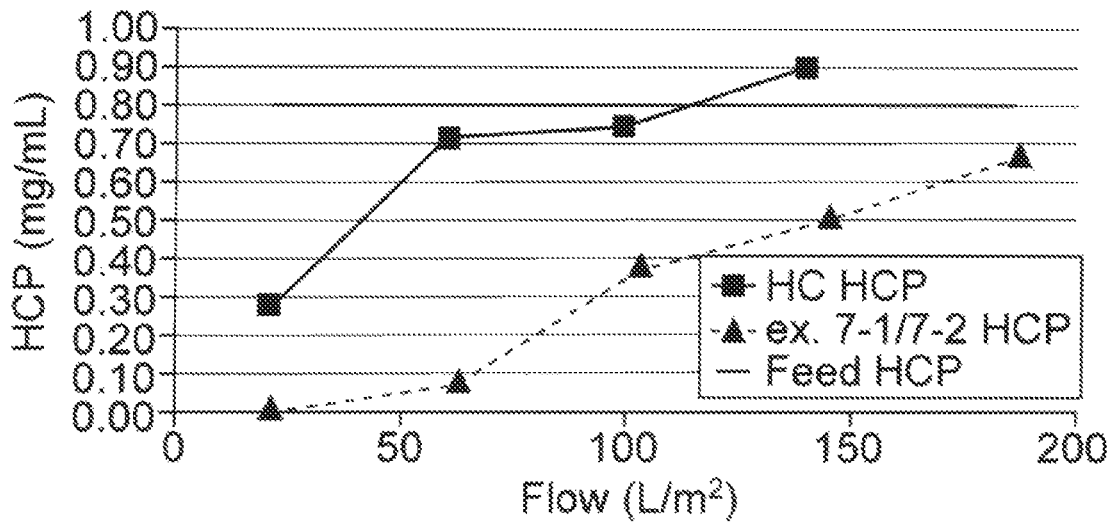
FIG. 6B is a plot of HCP impurity breakthrough for coupled Millistak+ primary and secondary depth filter benchmarks (D0HC/X0HC, black line) and coupled, prototype primary and secondary depth filters (device ID 7-1/ device ID 7-2, grey line), in accordance with certain embodiments of the invention.

FIG. 6 provides the pressure and HCP impurity clearance profiles for a depth filter clarification applications test using a HCCF containing a monoclonal antibody (mAb05) with a viable cell density $1.41 \times 10^7$ vc/mL.

The 23 cm$^2$ depth filter devices were constructed using the non-woven and depth filter media grades described in example 25. The filtration and impurity clearance performance of these devices were compared to commercial Millistak+® D0HC and X0PS devices (EMD Millipore, Billerica, Mass.). In these tests, the primary and secondary clarification depth filters were configured in a 2:1 area ratio.

A 2:1 area ratio is defined herein as two parallel primary filters coupled to a single secondary filter. In this example, two 7-1 depth filters and two D0HC devices served as the primary clarification filters. The 7-2 depth filter and the X0HC device served as the secondary clarification filters. The two 7-1 depth filters were coupled to the 7-2 depth filter device and the two D0HC devices were coupled to the X0HC device.

Un-clarified HCCF was pumped through the devices at a flow rate of 150 LMH (versus the primary filters) and 300 LMH (versus the secondary filter) and the pressure was monitored continuously by means of a system of pressure transducers and data logging equipment. The filtrate was fractionated and submitted for HCP ELISA and PicoGreen®

DNA assays. The pressure profile data presented in FIG. 6 shows the discovered advantages for the coupled 7-1/7-2 depth filter devices when compared to the coupled D0HC/X0HC devices for this HCCF feedstream.

Terminal pressure is reached for the D0HC devices at a throughput of 112 L/m², while similar pressures are not reached for the 7-1 devices until a throughput of 162 L/m². Similarly, the 7-2 depth filter device shows modestly lower pressures than the X0HC device at a much high feed throughput.

The HCP impurity clearance data also presented in FIG. 6 shows HCP/DNA impurity breakthrough for both the coupled D0HC/X0HC devices and the ID 7-1/ID 7-2 depth filter formats evaluated. This data shows the discovered advantages for the coupled ID 7-1/ID 7-2 devices compared to the coupled D0HC/X0HC format, as the D0HC/X0HC devices show complete HCP breakthrough at a throughput of≈100 L/m², while significant HCP impurity clearance for the ID 7-1/ID 7-2 devices is still observed until about 200 L/m².

Example 27

HCP and DNA impurity clearance (mAb05 feed).

Figure 7A:
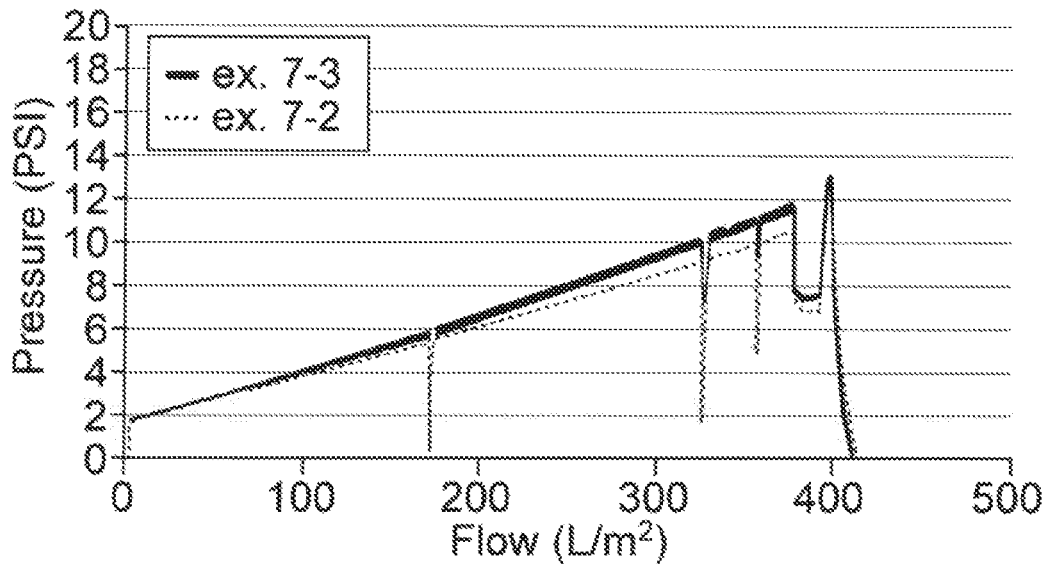
FIG. 7A are pressure profiles for uncoupled secondary clarification devices described in example 25, in accordance with certain embodiments of the invention.
Figure 7B:
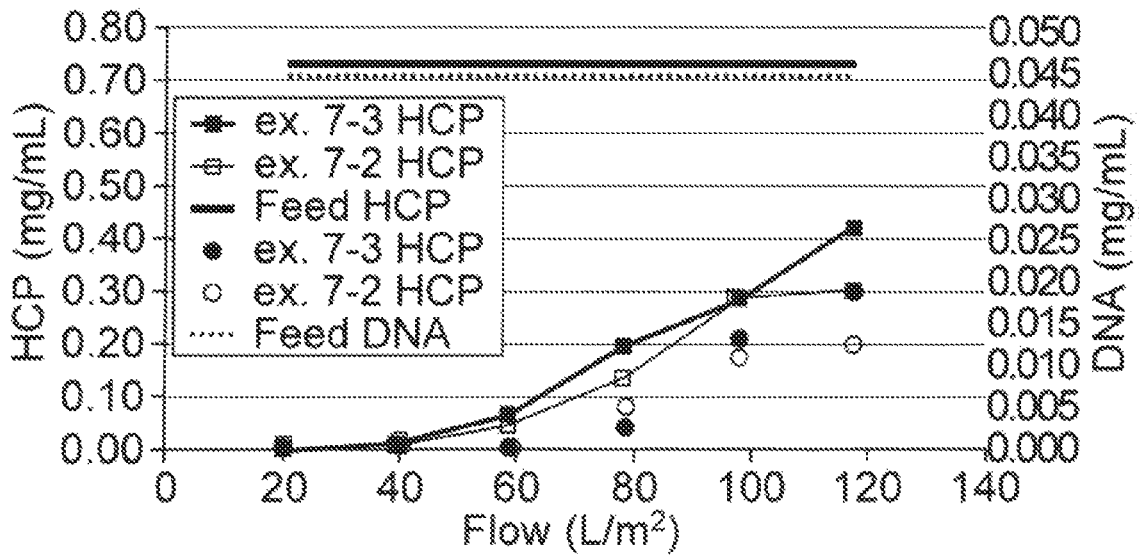
FIG. 7B is a plot of HCP and DNA impurity breakthrough for an uncoupled secondary depth filter (ID 7-3, HCP: black line, DNA: black circles) and an uncoupled secondary depth filter (ID 7-2, HCP: grey line, DNA: grey circles) in accordance with certain embodiments of the invention.

FIG. 7 provides the pressure, HCP, and DNA impurity clearance profiles for a depth filter secondary clarification applications test using a HCCF containing a monoclonal antibody (mAb05) with a viable cell density 8.38×10⁶ vc/mL.

The 23 cm² depth filter devices were constructed using the non-woven and depth filter media grades described in example 25. In these tests, a sufficient quantity of the HCCF was clarified through the prototype primary clarification depth filter device 7-1 described above. The filtrate was pooled and subsequently processed through the prototype secondary clarification depth filter devices 7-2 and 7-3 at a flow rate of 300 LMH (versus each secondary filter) and the pressure was monitored continuously by means of a system of pressure transducers and data logging equipment.

The filtrate was fractionated and submitted for HCP ELISA and PicoGreen® DNA assays. The pressure profile data presented in FIG. 7 shows a comparable performance for the un-coupled 7-2 and 7-3 prototype depth filter devices for this HCCF feedstream. The HCP and DNA impurity clearance data also presented in FIG. 7 shows a significant clearance of both HCP and DNA impurities for each of the 7-2 and 7-3 prototype devices evaluated at throughputs as high as 120 L/m². This data indicates acceptable performance for the 7-2 and 7-3 secondary clarification devices for HCP and DNA impurity clearance within the targeted clarification application.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions taught herein.

We claim:

1. A process for pre-use water flush of depth filters having lower bioburden comprising:
   a. providing a synthetic composite depth filter media comprising at least two layers, wherein at least one layer comprises synthetic fibrillated polymeric fibers comprising polyacrylonitrile and/or polyacrylonitrile copolymers, and a synthetic filter aid comprising one or more of silica, alumina, glass, metal oxides or mixed-metal oxides, ion-exchange resins and carbon;
   b. treating the depth filter media by,
      i. irradiating the depth filter media at a dose of about 10 to 45 kGy; or
      ii. flushing the depth filter media with 0.5 N NaOH for at 100 to 300 liters/m²/hr for 30 min., and
   c. flushing the treated depth filter media with water at flow rates ranging from about 10 liter/m²/hr to about 600 liter/m²/hr such that the level of total organic extractables measured in the filtrate is about 0 to 3 ppm.

2. The process of claim 1, wherein the at least one layer comprising synthetic fibrillated polymeric fibers comprising polyacrylonitrile or polyacrylonitrile copolymers, and a synthetic filter aid comprises at least 26% by weight of synthetic fibrillated polymeric fibers based on the total weight of the synthetic fibrillated polymeric fibers and filter aid.

3. The process of claim 1, wherein the at least one layer comprising synthetic fibrillated polymeric fibers comprising polyacrylonitrile or polyacrylonitrile copolymers, and a synthetic filter aid comprises over 0 to 90% of the filter aid by weight based on the total weight of the synthetic fibrillated polymeric fibers and filter aid.

4. The process of claim 1, wherein the synthetic composite depth filter media further comprises a wet strength resin, said wet strength resin comprising water-soluble synthetic polymers of urea or melamine-formaldehyde based polymers, polyaminopolyamide-epichlorohydrin (PAE) polymers or glyoxalated polyacrylamide (GPAM) resins.

5. The process of claim 4, wherein the content by weight of the wet strength resin based on the total weight of the synthetic fiber and filter aid is over 0% to about 5%.

6. The process of claim 1, wherein the synthetic composite depth filter media comprises at least one layer comprising a synthetic nonwoven or a microfiber layer, said synthetic nonwoven or microfiber layer comprising polypropylene, polyesters, polyethylene, nylon, polyacrylonitrile, carbon or glass.

7. The process of claim 1, wherein a feed flow direction is from a first layer to a second layer.

8. The process of claim 7, wherein the first filter layer is in direct contact with the second filter layer.

9. The process of claim 1, wherein said level of total organic extractables (TOC) is 2.0 parts per million (ppm) or less.

* * * * *